Dec. 4, 1962 J. B. MINTER 2ND 3,067,292

STEREOPHONIC SOUND TRANSMISSION AND REPRODUCTION

Filed Feb. 3, 1958 3 Sheets-Sheet 1

INVENTOR
JERRY B. MINTER, 2nd

BY John J. Logan
ATTORNEY

STEREOPHONIC SOUND TRANSMISSION AND REPRODUCTION

Filed Feb. 3, 1958 3 Sheets-Sheet 2

INVENTOR
JERRY B. MINTER, 2ND.
BY John J. Rogan
ATTORNEY

STEREOPHONIC SOUND TRANSMISSION AND REPRODUCTION

Filed Feb. 3, 1958 3 Sheets-Sheet 3

INVENTOR
JERRY B. MINTER 2nd

BY John J. Logan
ATTORNEY 3,067,292

STEREOPHONIC SOUND TRANSMISSION AND REPRODUCTION

Jerry B. Minter 2nd, Normandy Heights Road, Morristown, N.J.

Filed Feb. 3, 1958, Ser. No. 712,974
1 Claim. (Cl. 179—15)

This invention relates to the art of reproducing audio frequency signals of relatively wide frequency spectrum so as to impart realistic or stereophonic effects.

A principal object of the invention relates to methods and apparatus for reproducing signals with true stereophonic effects, particularly where the original signals are of wide dynamic range and originate over a relatively large volume of space.

Another principal object is to provide novel methods and apparatus for improving the ratio of signal-to-noise in stereophonic transmitting and reproducing systems.

Another principal object is to provide novel methods and apparatus for translating wide frequency spectrum sound signals into two parts, one of which is essentially a monaural signal and the other a stereophonic control signal, and mixing the two parts electrically so as to simplify the reproduction equipment required for realistic stereophonic reproduction with a high ratio of signal-to-noise.

Another object is to provide means to translate original wide frequency spectrum sound signals into two electric channels, one of which represents the monaural characteristics of the said original signals, and the other of which represents the stereophonic characteristics of those signals, the latter channel including a frequency transposition means in the form of a carrier modulator; and means to mix or combine the two signals for application to a single transmission link, leading to a stereophonic sound reproducer arrangement. This link may take any of the well known forms, such for example as a phonographic recording and play back mechanism, whether of the disc or magnetic tape kind; or it may take the form of any well known radio transmission channel having the usual carrier modulation and demodulation equipment.

A feature of the invention relates to a stereophonic sound reproducing system employing a monaural wide band channel, and a narrow band stereophonic control channel, in conjunction with circuit connections whereby the outputs of both channels can be combined and transmitted to control respective reproducers to give realistic stereophonic reproduction while maintaining a high ratio of signal-to-noise.

Another feature relates to a system for translating audio frequency signals derived from a plurality of stereophonically related microphones or the like, so as to produce in-phase addition of the full frequency spectrum from each microphone, while producing a vector difference of a relatively narrow frequency spectrum from the microphones, and then converting the said difference signal into a relatively wide frequency swing of a modulated carrier whose center frequency is well beyond the upper useful frequency of the said wide spectrum, and electro-acoustically combining the two spectra to effect stereophonic sound reproduction.

Another feature relates to a system for translating audio frequency signals derived from a pair of stereophonically related microphones or the like, so as to produce a monaural signal and a separate stereophonic control signal, the latter being limited in band width; and means to transmit both signals over a single transmission link or medium so that both signals are subjected to the same undesirable noise or other disturbance, the stereophonic control signal being in the form of a modulated carrier whose center or unmodulated frequency is well above the upper useful frequency of the original audio signals, and whose side-band frequencies, in the case of amplitude modulation, or whose frequency excursions or shifts, in the case of frequency modulation, occupy a much wider frequency spectrum than the spectrum of said stereophonic control signal.

A further feature relates to a realistic stereophonic sound reproducing system wherein the outputs of the originating sources, such for example as a pair of stereophonically related microphones, are respectively translated into two separate frequency channels, one representing a monaural or in-phase addition of both microphone outputs, and the other representing the vector difference of the microphone outputs, the latter being of very much narrower band width than the former, in conjunction with means to multiplex both signals on a frequency division basis for transmission over a single transmission link, so as to control a sound reproducing system employing at least two stereophonically related sound reproducers.

A further feature relates to an improved stereophonic sound recording and reproducing system employing a pair of audio frequency pick-up devices or microphones, means to combine the outputs from the microphones in additive phase to produce a main signal of wide frequency band, means to vectorially substract a part of the output from the microphones to produce a stereophonic control signal, means to limit the frequency band of the said control signal, means to modulate a carrier by said control signal to produce frequency excursions of the carrier in a frequency band beyond the upper useful frequency of said main signal, means to multiplex said main signal with said control signal, and receiving means including frequency discriminating means to separate into two channels the main signal and the control signal for application to respective stereophonically related sound reproducers.

A further important feature is the compatability of this novel system with the existing phono record reproducing equipment—that is, the records can be played on standard lateral reproducers and the full monaural channel is heard without an increase in noise. The carrier is not heard and its amplitude is low enough so that no audible noise is present. This full compatibility is of prime importance for public acceptance, as has been well illustrated by color television.

A still further feature relates to the novel organization, arrangement and relative location and interconnection of parts which by their conjoint operation provide an improved stereophonic sound transmission and reproducing system.

Other features and advantages not specifically enumerated will be apparent after a consideration of the following detailed descriptions and the appended claim.

In the drawing, which shows by way of example, certain preferred embodiments,

In the transmission of audio signals having a wide dynamic range and having a distribution over a wide volume of space, it becomes difficult for the attainment of realistic stereophonic reproduction, to accommodate those requirements with only one audio transmission channel. That difficulty is even present where the audio frequency signals are transmitted over a transmission channel or link using wide band frequency modulation techniques to improve the signal-to-noise ratio at the expense of band width. The present invention provides methods and means for achieving the desired realistic stereophonic reproduction by developing from the original sound source, two separate signals, one of which may be considered a broad frequency band monaural signal, and the other of which may be considered a stereophonic control signal of purposely limited band width. The stereophonic control signal is, by a carrier modulation process, transposed to a higher portion of the frequency spectrum, preferably just beyond the uppermost useful frequency of the monaural signal. The transposed signal and the wide band monaural signal are then mixed or multiplexed on a frequency division basis, to produce an output which can be used to record directly on any suitable sound recording medium, or which can be transmitted to a distant point using any conventional radio transmission and reception apparatus. If desired, the monaural wide band signal can be subjected to any well known form of volume compression, prior to the recording operation or prior to the transmission over the radio channel. Likewise the wide band monaural signal at the receiver can be subjected to a complementary volume expansion controlled by direct current from the carrier.

Figures 1, 1A, 2:
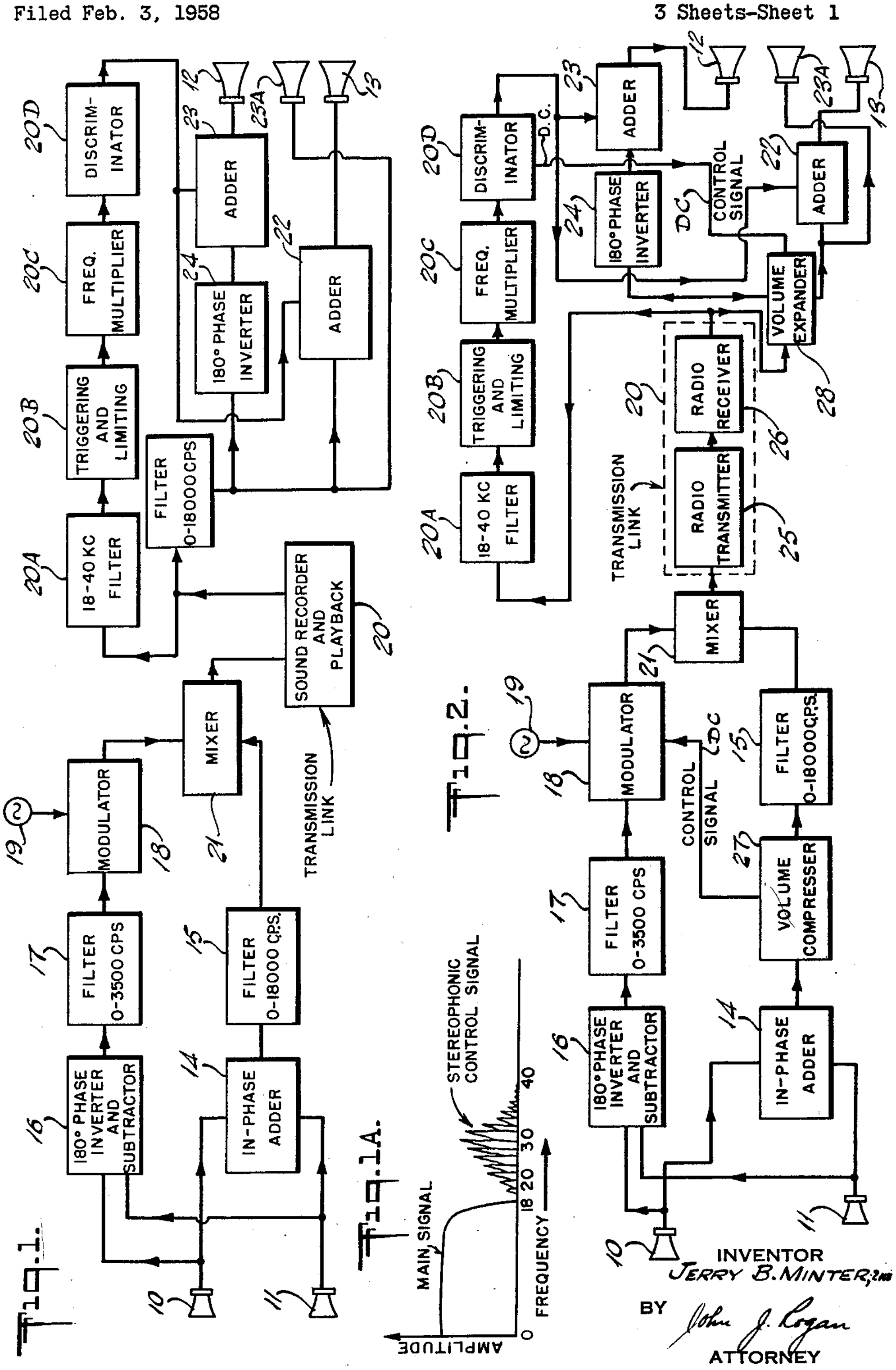
FIG. 1 is a schematic block diagram of a sound transmitting and reproducing system embodying features of the invention.
FIG. 1A is a graph used in explaining the invention.
FIG. 2 is a schematic block diagram of a modification of the system of FIG. 1.

Referring to FIG. 1, there are shown by way of example, two audio frequency sound pick-up devices 10, 11, each of which may be any well known form of microphone, the microphones being spaced apart a suitable distance, for example approximately 3 to 8 feet to produce stereophonic effects in the reproduced signals from the sound reproducers 12, 13. The electrical signal from the microphones 10, 11 are applied to any well known signal combining network 14 in which they are electrically added in-phase, to produce at the output of network 14 a combined signal which is of greater amplitude than either of the individual microphone output signals. Such combined signal is essentially a monaural signal, and for convenience of description herein will be referred to as the main signal, and by itself is not capable of producing the desired stereophonic effects. Merely for explanatory purposes it will be assumed that the audio signals acting on the microphones 10, 11 are in a relatively wide frequency spectrum for example 0–18 kc. The output of network 14 contains all those signal frequencies up to the uppermost frequency of 18 kilocycles per second. Preferably, although not necessarily, the said main wide band signal is passed through a low pass filter 15 which cuts off frequencies above 18 kc. Such a filter is desirable when the transmission link between the microphones 10, 11 and the reproducers 12, 13 is somewhat non-linear, and when the main signal and the stereophonic signal are transmitted over the same medium having a non-linear amplitude transmission characteristic.

A portion of each of the outputs from microphones 10, 11 is applied to any well known network 16 which inverts the phase of the signals from only one of the microphones, for example microphone 10, and which also combines the inverted phase signal with the non-inverted phase signal so as to produce a single output signal from network 16 which represents the vector difference between the two microphone outputs. Thus a sound wave applied to both microphones directly in front of them and equi-distant from both microphones, would tend to cancel and produce negligible output from network 16 for that particular sound wave. However, a signal originating from a source not symmetrically related to both microphones would arrive at the microphones at slightly different times, and thus would yield in the output of network 16 a difference signal which therefore identifies the location of that signal source with respect to the microphones.

I have found that in order to achieve realistic stereophonic reproduction it is not necessary that the difference signal from network 16 be of the same spectrum width as the main signal from network 14. In fact for certain purposes it is undesirable that such control signal be of very wide frequency range. I have found that the frequencies making up the control signal can be confined to the lower end of the frequency spectrum of the main signal. For example the signal from network 16 is passed through a filter 17 of any well known design for cutting off all frequencies above 3500 c.p.s. That cutoff frequency is not critical and can be determined empirically by listening tests, since the essential information for stereophonic control is substantially in the band below 3500 c.p.s. I have found that the removal of the unnecessary frequencies from the stereophonic control signal enables the attainment of considerable improvement in signal-to-noise ratio in the transmission over the same link as the main signal, and also affords an economy in required band width of the transmission medium.

The frequency limited stereophonic control signal is then applied to a modulator 18 to modulate a carrier frequency generated by any well known carrier source 19. The carrier should have a center frequency which is sufficiently above the uppermost frequency of the main signal from network 14, so that the frequency excursion of the modulated signal from the carrier modulator in the case of a frequency modulator, or the side-band range in the case of an amplitude modulator, does not substantially encroach on the main signal band from network 14. Thus in the above assumed example the uppermost useful frequency in the audio signal band is 18 kc., in which case if the modulator is of the frequency modulation kind, then the center frequency of the oscillator 19 can be 30 kc. and the modulation swings can be between 20 kc. and 40 kc., as indicated in the graph of FIG. 1A. If the modulation is amplitude modulation, then the carrier can likewise be of 30 kc. and the side band frequencies can be limited between 20 kc. and 40 kc. by any well known filters. It will be understood that the range 20 kc.–40 kc. is merely given as typical. For example, if the main signal and the stereophonic control signal are to be recorded on any well known tape recorder arrangement employing the well known bias oscillator for biasing the normal magnetization of the recording-playback head, that bias oscillator may also be used to supply the carrier for modulation with the stereophonic control signal, thus requiring only a single oscillator. Since the usual bias oscillator for tape recorders is approximately 60 kc., then with a normal tape speed of approximately 30 inches per second there could be obtained a deviation of at least 10 kc. on either side of the 60 kc. oscillator. Prior to applying the signals to the transmission link 20, they are applied to any well known mixer device or network 21.

The transmission link 20 may be any well known kind of sound recording and playback unit, such as any well known tape recorder or the like having a recording head for recording the signals from mixer 21, and a playback head for translating the record into corresponding playback voltages. These playback voltages will have, for example, the frequency spectrum shown in FIG. 1A. Part of the playback voltage output is passed through a tuned circuit or filter 20A having the desired pass band, for example 20 kc. to 40 kc., and thence through any well known triggering and limiting network 20B. If the center frequency is for example 30 kc., in order to reduce the noise effects which may be present because of the relatively close relation between the modulating signals and the carrier, the signal from network 20B is multiplied in frequency in any well known frequency multiplier 20C, and the multiplied frequency signal is then applied to any well known frequency discriminator 20D. In the manner well known in frequency demodulators, the frequency-limited stereophonic control signal in the band 0–3500 c.p.s., appears at the output of the discriminator. This signal is then added in the network 22 with part of the playback signal from device 20, and the in-phase added voltages are applied to the sound reproducer 13. A part of the signal from discriminator 20D is also added in an adding network 23 with part of the playback signal from device 20, after the latter has been phase inverted in any well known 180 degree phase inversion network 24. The output of adder 23 is then applied to the sound reproducer 12. A third or phantom sound reproducer 23A may also be used and supplied with the playback signal directly from the device 20. When the sound reproducers are spaced appropriately apart, their combined output gives a truly realistic stereophonic reproduction with the desired degree of dynamic range. It will be understood that the third sound reproducer 23A is not necessary for achieving the desired stereophonic effect, and its use is therefore optional. It will also be understood that suitable amplifiers will be included at various parts of the system where required.

FIG. 2 shows a modification of FIG. 1 where, instead of a transmission link of the sound recording-playback kind for the transmission of the signals, the signals are transmitted to a remote point by any well known radio transmitter and radio receiver 25, 26. In addition, if desired, any well known volume compressor 27 may be used at the transmitting end of the system, and a complementary volume expander 28 can be used at the receiving end of the system. In accordance with the well known action of a volume compressor, there is generated a direct current signal which can be transmitted via the modulator 18 by shifting the center frequency of the modulated carrier stereophonic signal. Likewise at the receiver a direct current control voltage derived from the discriminator 20D controls the volume expander 28 to correspondingly expand the main signal output. The remaining parts of FIG. 2 can be the same as the correspondingly numbered parts of FIG. 1 and further description thereof is not believed necessary at this point. It will be understood, of course, that the system shown in FIG. 1 may also include a volume compressor and volume expander similar to FIG. 2.

Figure 3:
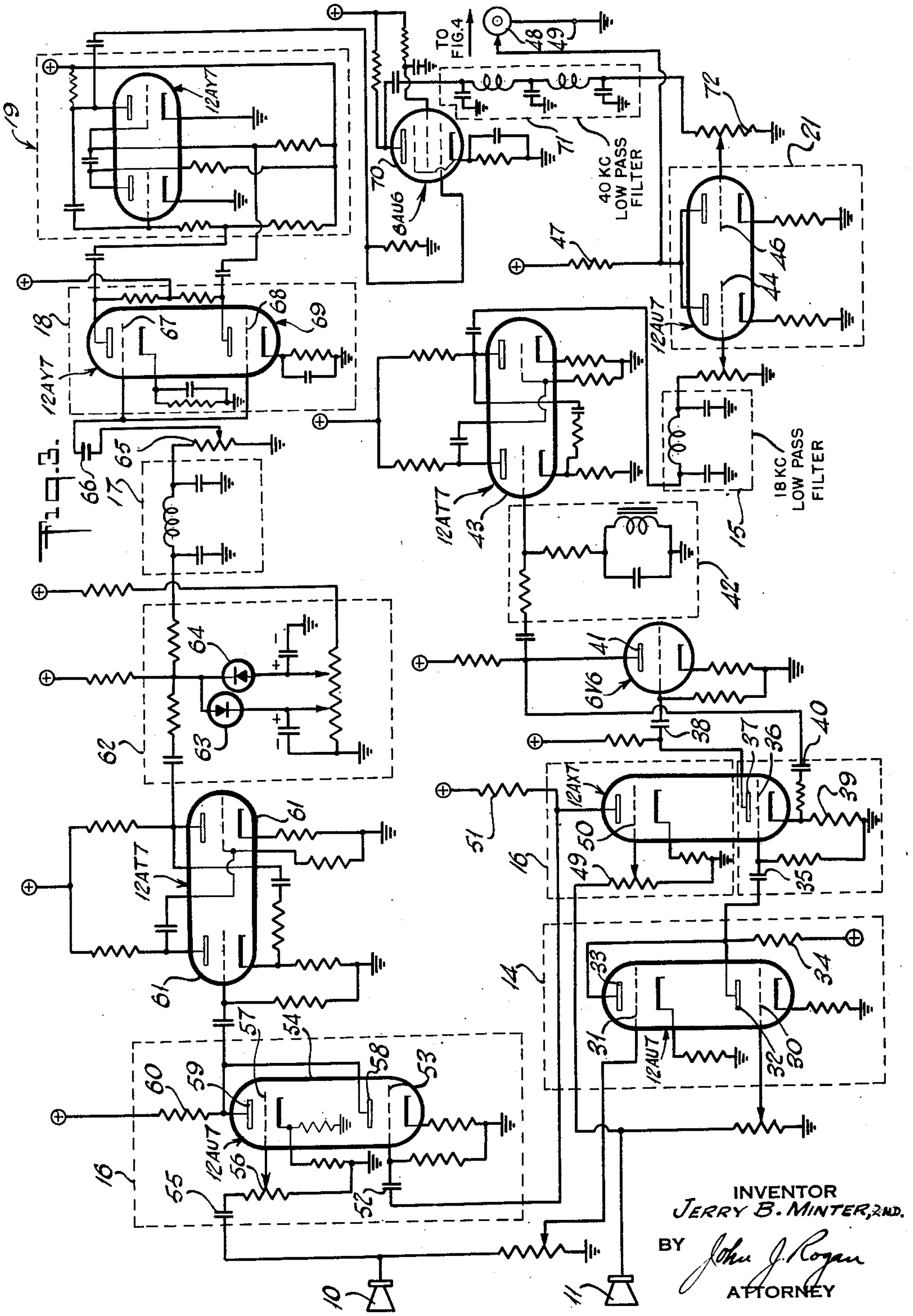
FIG. 3 is a schematic wiring diagram of part of the system of FIG. 1.
Figure 4:
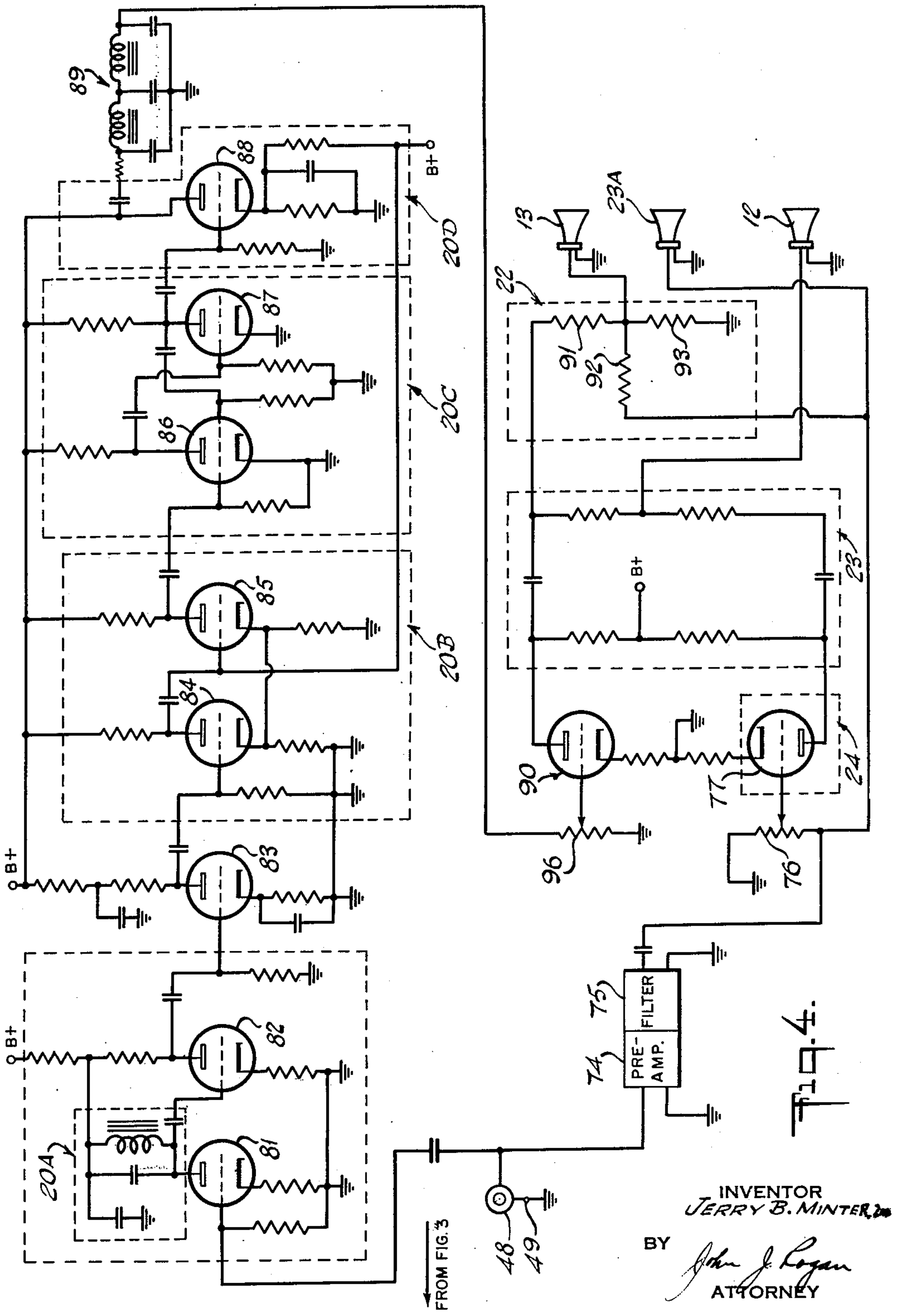
FIG. 4 is a schematic wiring diagram of the remaining part of the system of FIG. 1.

FIGS. 3 and 4, when placed alongside each other, provide a schematic wiring diagram of the system shown in FIG. 1. The blocked parts of FIGS. 3 and 4, which are the same as those of FIG. 1, bear the same designation numerals in the respective figures. The in-phase adder 14 may comprise a type 12AU7 twin triode, on whose control grids 30, 31 are impressed the 0–18 kc. signals from the spaced microphones 10, 11. The plates or anodes 32, 33 are connected in like phase to the common load resistor 34. The signals across resistor 34 are applied through condenser 35 to the control grid 36 of one-half of the twin triode type 12AX7, one of whose output anodes 37 is connected through condenser 38 to the control grid of the triode amplifier type 6V6. The cathode load resistor 39 is connected through a feedback resistor and blocking condenser 40 to the anode 41 and thence to the network 42, which is of any well known design, to provide "pre-emphasis" of the amplified signals up to 18 kc. The signal from network 42 is then amplified in the twin triode feedback amplifier tube 43, which may be of a type 12AT7. The output of amplifier 43 is then passed through 18 kc. low-pass filter 15 to the control grid 44 of a twin triode mixer tube 45, which may be of the type 12AU7. The signal impressed on control grid 44 is therefore the in-phase amplified or added signals from the two microphones.

The control grid 46 has applied thereto the modulated carrier stereophonic control signal, so that the output at the common load resistor 47 is connected to the input terminal 48 of the recording amplifier of any well known kind of sound recorder and playback device. A part of the output from the microphone 11 is connected through the gain control potentiometer 49 to the control grid 50 of the phase inversion portion of the twin triode 12AX7. The output load resistor 51 is connected through condenser 52 to the control grid 53 of another twin triode 54, which may be of the type 12AU7. A portion of the output from microphone 10 is applied through condenser 55 and the gain control potentiometer 56 to the control grid 57 of the other portion of the twin triode 54. The plates or anodes 58, 59 are connected together and to a common load resistor 60 which therefore has developed across it signals which represent the vector difference between the signals from the two microphones. These vector difference signals are then amplified in a suitable amplifier, such as the twin triode tube 61 which may be of the type 12AT7. The amplified difference signal may, if desired, be passed through a peak clipper network 62 of any wellknown design, including for example the clipping diodes 63, 64. The peak clipped signal is then passed through the low-pass filter 17 which for example may have a pass band of 0 to 3500 c.p.s.

The signal from filter 17 is applied through gain control potentiometer 65 and condenser 66 in phase to the control grids 67, 68 of a twin triode modulator tube 69, which may for example be of a type 12AY7. The carrier oscillator 19 may be of any well known kind comprising for example a twin triode 12AY7 which has its various electrodes interconnected in any well known manner to act as a 30 kc. multivibrator, which is interconnected with the modulator 18 so that the multivibrator frequency is modulated over the range 20 kc. to 40 kc. in the well known manner. It will be understood, of course, that the invention is not limited to the particular kind of oscillator-modulator shown in FIG. 3, and any other well known oscillator-modulator may be employed, such for example as a reactance tube modulator, a ferrite modulator, and the like. Neither is the invention limited to any particular center frequency for the carrier from source 19, or to any particular deviation range of the modulations. For example, if desired, the carrier may have a center frequency of 22 kc., and may be modulated between 18 kc. and 26 kc. The modulated carrier from the oscillator-modulator can then be amplified in a suitable power pentode amplifier 70, for example of the type 6AU6, whose output is connected through a suitable 40 kc. low-pass filter 71 to the input gain control potentiometer 72 connected to the mixer grid 46. Thus, there appears at terminals 48, 49 a signal which, under the above assumed example, has a spectrum illustrated in the corresponding part of FIG. 1A.

Referring to FIG. 4, there is shown a playback system that may be used in conjunction with the system of FIG. 3. The parts of FIG. 1 and FIG. 4 which function alike, bear the corresponding designation numerals. The signals from the playback device 20 are divided into two channels, one of which transmits the monaural or main signal, and the other of which demodulates and transmits the stereophonic control signal, of limited frequency. The monaural channel comprises a pre-amplifier 74 which includes a filter 75 for filtering out the frequencies above 18 kc. The band 0–18 kc. is then applied through a balancing potentiometer 76 to the control grid of a triode 77 which, for example, may comprise one-half of a twin triode of the type 12AU7, whose output is applied to the adding network 23 and thence to the sound reproducer 12.

The playback signal from device 20 is also applied to a tuned carrier amplifier consisting, for example, of a pair of triodes 81, 82 constituting a type 12AT7 tube. The amplifier includes a suitable tuned circuit or filter 20A for amplifying only the band 20 kc. to 40 kc. This frequency modulated band may then be amplified in another amplifier triode 83, whose amplified output is applied to a pulse triggering and limiting device 20B comprising, for example, the twin triodes 84, 85. The pulses from device 20B are then doubled in frequency in any well known frequency doubler or multiplier 20C, such for example as a free-running multivibrator consisting of a pair of triodes 86, 87 cross-connected to form the well known Abraham and Bloch multivibrator. The doubled frequency pulses are then passed through any well known frequency discriminator 20D consisting, for example, of the triode 88 connected to act as a discriminator of the counter type, which produces at its output the 0–3500 c.p.s. stereophonic control or difference signal. Preferably the difference signal is passed through an integrating filter 89 to remove the carrier ripple from the demodulated difference signal. It will be understood that the invention is not limited to the particular means shown for demodulating the difference signal from the modulated carrier, and therefore any other well known demodulating means may be employed.

The difference signal is then applied to the control grid of an isolating triode amplifier tube 90 whose output is applied to the adding network 22 comprising, for example, the resistors 91, 92, 93, where it is added in phase to the monaural signal from the amplifier 74, and the added signals are then applied to the sound reproducer 13. On the other hand, the difference signal from tube 90 is applied to the adding network 23 which also receives the monaural signal after the latter has been phase inverted in tube 71, so that the sound reproducer 12 is controlled by the out-of-phase addition of the monaural signal and the difference signal. If a third or phantom sound reproducer 23A is employed it can receive the monaural signal over conductor 95 directly from the amplifier-filter 74—75. It will be noted that another balancing potentiometer 96 is provided. Thus by means of potentiometer 76 and 96 it is possible to balance the reproducing system so that for a sound source which is equally and symmetrically located with respect to the two microphones 10, 11, the two reproducers 12, 13 are equally energized. However for a sound source which is unequally spaced from the two microphones, the two reproducers will be correspondingly differently energized to produce the desired stereophonic effect.

Various changes and modifications may be made in the particular embodiments disclosed, without departing from the scope of the invention as set forth in the appended claim.

What is claimed is:

Apparatus for stereophonic sound transmission comprising, a first channel to receive microphone signals from a plurality of spaced microphones with the said signals vectorially added and covering a wide range audio frequency band, a second channel to receive microphone signals from said microphones with the said signals vectorially subtracted, means in said second channel to limit the frequency band of the subtracted signals to the lower end of said band, means to transpose by frequency modulation said subtracted signals to a frequency range well above the maximum useful frequency range of said microphone signals, means to apply the signals from both said channels to a single recording device, and means are provided to produce under control of the dynamic range of the added signals a volume compression voltage, and means to apply said voltage to shift the center frequency of the said transposed frequency modulated subtracted signals.

References Cited in the file of this patent

UNITED STATES PATENTS

| | | |
|---|---|---|
| 2,093,540 | Blumlein | Sept. 21, 1937 |
| 2,536,664 | Sinnett et al. | Jan. 2, 1951 |
| 2,698,379 | Boelens et al. | Dec. 28, 1954 |
| 2,779,020 | Wilmotte | Jan. 2, 1957 |
| 2,845,491 | Bertram | July 29, 1958 |
| 2,874,221 | Dauguet | Feb. 17, 1959 |
| 2,851,532 | Crosby | Sept. 9, 1958 |